United States Patent
Tate et al.

(10) Patent No.: US 8,456,126 B2
(45) Date of Patent: Jun. 4, 2013

(54) MOTOR CONTROL SYSTEM AND MOTOR CONTROL METHOD

(75) Inventors: Mitsuaki Tate, Kumagaya (JP); Yasushi Ishii, Kumagaya (JP); Masamichi Kihara, Kumagaya (JP)

(73) Assignee: Hitachi High-Tech Instruments Co., Ltd., Kumagaya-shi (JP)

( * ) Notice: Subject to any disclaimer, the term of this patent is extended or adjusted under 35 U.S.C. 154(b) by 272 days.

(21) Appl. No.: 13/044,000

(22) Filed: Mar. 9, 2011

(65) Prior Publication Data
US 2012/0212171 A1 Aug. 23, 2012

(30) Foreign Application Priority Data
Feb. 18, 2011 (JP) .................................. 2011-033739

(51) Int. Cl.
G05B 19/416 (2006.01)
G05B 19/35 (2006.01)

(52) U.S. Cl.
CPC .................................... *G05B 19/351* (2013.01)
USPC ........... 318/600; 318/602; 318/603; 318/604; 318/605; 318/606

(58) Field of Classification Search
CPC .................................................... G05B 19/351
USPC .................. 318/560, 600, 602–609
See application file for complete search history.

(56) References Cited

U.S. PATENT DOCUMENTS
7,462,998 B2 * 12/2008 Akiyama ..................... 318/162

FOREIGN PATENT DOCUMENTS
| JP | 3-36977 A | 2/1991 |
| JP | 2007-316702 A | 12/2007 |
| JP | 2009-187521 A | 8/2009 |

* cited by examiner

*Primary Examiner* — Walter Benson
*Assistant Examiner* — David Luo
(74) *Attorney, Agent, or Firm* — Crowell & Moring LLP (57) ABSTRACT

There is provided a motor control system and motor control method which can shorten settling time by restraining vibration and deviation relative to an advancing direction during operation. Moreover, according to the present invention, it is possible to cause a motor to be operated with an ideal track and, since it is possible to always monitor a present position, it is made easy to cause a plurality of axes to be synchronously operated. The motor control system is provided with a unit generating command waveforms from a jerk data which has significant effects on the vibration relative to the advancing direction, and a unit performing a real time real position control of regenerating future command waveforms according to a deviation amount, while always performing jerk-limit, whereby the vibration and the deviation relative to the advancing direction when the motor operates at high speed are restrained.

9 Claims, 10 Drawing Sheets

JERK-ADDED WAVEFORM

MOTOR CONTROL SYSTEM AND MOTOR CONTROL METHOD

FIELD OF THE INVENTION

The present invention relates to a control system driving a servo motor which is used for moving a work that is a driven material in a machine tool or an industrial machine and, more particularly, to a motor control system and motor control method for a semiconductor manufacturing device such as a die bonder, etc.

BACKGROUND OF THE INVENTION

Figure 1:
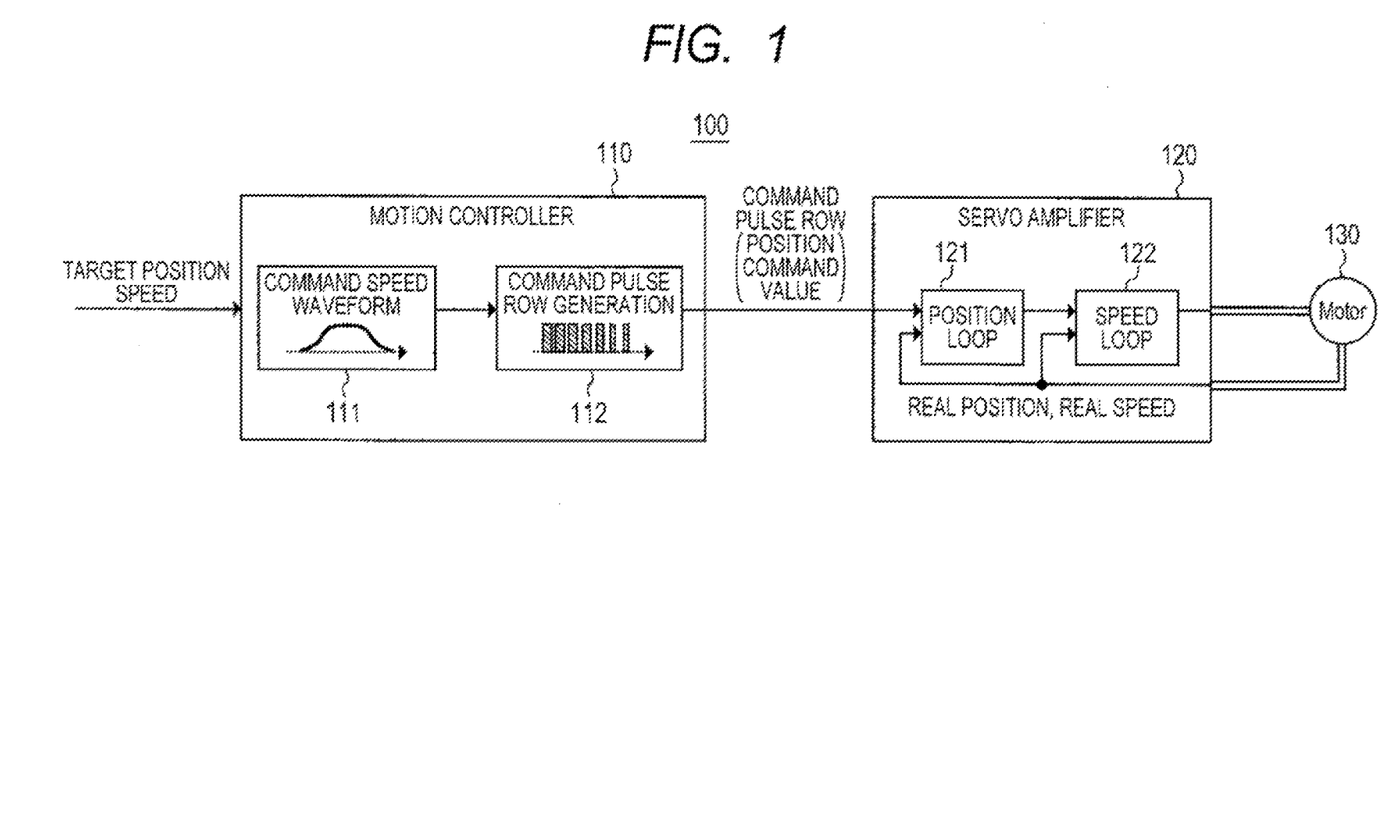
FIG. 1 is a block diagram illustrating a structure of a conventional control system.

For example, as shown in FIG. 1, a conventional control system 100 for a servo motor is made under open loop control, as a glance at a motion controller, and makes compensation for a position and speed in a servo amplifier 120 (a speed loop control section 122 and a position loop control section 121) only, while utilizing a present command position, and a real position and a real speed that are obtained from a motor 130. That is, when target position-speed is given to the control system 100, a command pulse row generation section 112 by turns outputs position command values to the servo amplifier 120 as command pulse position command values, according to an output of a command speed waveform generation section 111. The servo amplifier 120 responds to the inputted position command values, and the position loop control section 121 and the speed loop control section 122 output control signals to the motor 130. That is, the motor 130 revolves according to the control signals and, according to the revolution, the real position and the real speed are fed back to the position loop control section 121 and the speed loop control section 122 in which a feedback control is performed.

In the above-mentioned prior art, in the event that the motor is operated at high speed, future command waveforms can not be grasped in the servo amplifier 120. For this reason, it is difficult to easily restrain vibration relative to an advancing direction or settling time. Moreover, the motor control is made under an accumulated error pulse (or a positional deviation pulse or an error pulse) mode, so that when synchronous control or the like is performed, it is difficult to cause the motor to be operated with an ideal track.

However, in the past, it is necessary to smoothly accelerate/decelerate a work or a unit supporting the work, so as not to apply mechanical shock to the work, and move the work. JP-A No. 03-36977 describes an acceleration/deceleration control method for a servo motor, in which in the servo motor that performs control of a position and speed while calculating a speed command value at real time, on the basis of command values of a target position, a target speed, and acceleration/deceleration time, the acceleration/deceleration time is divided into three regions including an acceleration increase region, an acceleration constant region, and an acceleration decrease region, and the acceleration/deceleration is performed while calculating the speed command value at real time in such a manner that the speed command value becomes constant in each region. Also, JP-A No. 2007-316702 describes a servo motor drive control system which receives a position command from a computer numerical control device repeatedly giving a periodical position command to a servo motor, receives a signal indicative of a position of a driven material from a position detector, demands a first positional deviation data from means obtaining a first positional deviation between the position command and the position of the driven material, and controls the position of the driven material based on the first positional deviation and the first correction data. Moreover, JP-A No. 2009-187521 describes a position command preparing method and system, in which in the process of preparing a position command that accelerates according to a designation acceleration for each command cycle, until speed corresponding to a position command difference that is a difference between a this-time value and a last-time value of the position command reaches a designation speed, in the event that, if the speed corresponding to the position command difference is further accelerated, it can not deceleration-stop at a designation position at decelerated speed, the position command is prepared in such a manner to become speed corresponding to the position command difference, which deceleration-stops at a command position at decelerated speed and, if a jerk at a peak of a speed pattern formed from a relationship between the speed corresponding to the position command difference and a positioning time becomes larger than a jerk limit value predetermined by a program, the position command is prepared in such a manner that the jerk becomes equal to or less than the jerk limit value.

SUMMARY OF THE INVENTION

Problems to be Solved by the Invention

In the above-mentioned prior art, in the event that the motor is operated at high speed, future command waveforms can not be grasped in the servo amplifier 120. For this reason, it is difficult to easily restrain vibration relative to an advancing direction or settling time. Moreover, the motor control is made under an accumulated error pulse mode, so that when synchronous control or the like is performed, it is difficult to cause the motor to be operated with an ideal track.

In view of the above-mentioned problems, the object of the present invention is to provide a motor control system and motor control method which can shorten settling time by restraining vibration relative to an advancing direction and a deviation.

Moreover, according to the present invention, it is possible to cause a motor to be operated with an ideal track and always monitor a present position, thus making it easy to cause a plurality of axes to be synchronously operated.

Means for Solving Problems

In order to achieve the above-mentioned object, the motor control system of the present invention for implementing a motor control method according to the present invention is provided with means generating a command waveform from a jerk data which has significant effects on the vibration relative to the advancing direction, and means performing a real time real position control of regenerating command waveforms of future waveforms according to a deviation amount, while always performing jerk-limit, whereby the vibration and the deviation relative to the advancing direction are restrained and shortening of the settling time is realized.

Namely, the motor control system according to the present invention is a motor control system, which drives a driven material by a servo motor and controls it, and comprises an ideal waveform generation section generating ideal command waveforms of jerk, acceleration, speed, and a position, a command waveform generation section reading out the ideal waveforms, regenerating a target command position, and command waveforms of the jerk, the acceleration, the speed and the position, and outputting a command waveform of the speed regenerated, a DAC converting the command waveform of the regenerated speed to an analog date, and a servo motor driving according to control of the analog date and outputting a real position as an encoder signal, the command waveform generation section being provided with a command waveform regeneration processing section which generates a jerk-added waveform based on the real position according to the encoder signal, and the target command position, adds the generated jerk-added waveform to the previous-time command jerk waveform to regenerate a jerk command waveform, and regenerates a command acceleration waveform, a command speed waveform, and a command position waveform, and a command waveform input/output section which stores the generated ideal command waveforms, the regeneration jerk command waveform, the command acceleration waveform, the command speed waveform, and the command position waveform.

Preferably, in the motor control system according to the present invention, the command waveform regeneration processing section includes a jerk-added waveform generation section which generates the jerk-added waveform from a deviation amount which is a difference between the rear position according to the encoder signal, and the target command position.

More preferably, in the motor control system according to the present invention, the command waveform regeneration processing section further includes a jerk limit section and outputs NG information to the command waveform input/output section when the regenerated command jerk waveform exceeds a predetermined jerk upper limit value or is less than a predetermined jerk lower limit value and, when the NG information is inputted, the command waveform input/output section restores the command jerk waveform, the command acceleration waveform, the command speed waveform, and the command position waveform which are regenerated with the previous-time timing, regards the restored command jerk waveform, command acceleration waveform, command speed waveform, and command position waveform as the regenerated command jerk waveform, command acceleration waveform, command speed waveform, and command position waveform, and outputs the regenerated command acceleration waveform to the DAC.

More preferably, in the motor control system according to the present invention, the command waveform regeneration processing section further includes a jerk limit section outputting NG information when the regenerated command jerk waveform exceeds a predetermined jerk upper limit value or is less than a predetermined jerk lower limit value, and a command waveform restoration section restoring the command jerk waveform, the command acceleration waveform, the command speed waveform, and the command position waveform which are regenerated with the previous-time timing and, when the NG information is inputted, and inputting them to the command waveform input/output section, and the command waveform input/output section regards the command jerk waveform, the command acceleration waveform, the command speed waveform, and the command position waveform which are restored, as the regenerated command jerk waveform, command acceleration waveform, command speed waveform, and command position waveform, and outputs the regenerated command speed waveform to the DAC.

More preferably, in the motor control system according to the present invention, the command waveform generation section stores the command jerk waveform, the command acceleration waveform, the command speed waveform, and the command position waveform which are regenerated, as the command speed waveforms which are regenerated with the previous-time timing.

Moreover, a motor control method according to the present invention is a motor control method of a motor control system for driving and controlling a driven material via a servo motor, the motor control method comprising the steps of generating ideal waveforms of jerk, acceleration, speed, and a position, reading out the ideal waveforms, regenerating a target command position, and command waveforms of the jerk, the acceleration, the speed and the position, outputting a command waveform of the regenerated speed as an analog data, driving the servo motor according to control of the analog data, outputting a real position as an encoder signal, generating a jerk-added waveform on the basis of the real position according to the encoder signal, and the target command position, adding the generated jerk-added waveform to a command jerk waveform regenerated by a command waveform generation section with previous-time timing, and regenerating a jerk command waveform, and regenerating the command jerk waveform, the command acceleration waveform, the command speed waveform, and the command position waveform.

Preferably, in the motor control method according to the present invention, the jerk-added waveform is generated from a deviation amount which is a difference between the real position according to the encoder signal, and the target command position.

More preferably, in the motor control method according to the present invention, if the regenerated command jerk waveform exceeds a predetermined jerk upper limit value or is less than a predetermined jerk lower limit value, NG information is outputted, if the NG information is outputted, the command jerk waveform, the command acceleration waveform, the command speed waveform, and the command position waveform which are regenerated with the previous-time timing are restored, the command jerk waveform, the command acceleration waveform, the speed waveform, and the command position waveform which are restored are regarded as the command jerk waveform, the command acceleration waveform, the command speed waveform, and the command position waveform which are regenerated, the regenerated command speed waveform is outputted as an analog data, and the servo motor is driven according to control of the analog data.

More preferably, in the motor control method according to the present invention, the command jerk waveform, the command acceleration waveform, the command speed waveform, and the command position waveform which are regenerated are stored as command waveforms which are regenerated with the previous-time timing.

Advantageous Effects of the Invention

According to the present invention, it is possible restrain vibration and deviation relative to an advancing direction when the motor operates at high speed, and realize settling time shortening. Moreover, it is possible to cause the motor to be operated with an ideal track and, since it is possible to always monitor the present position, it is made easy to cause a plurality of axes to be synchronously operated.

DESCRIPTION OF EMBODIMENTS

Figure 2:
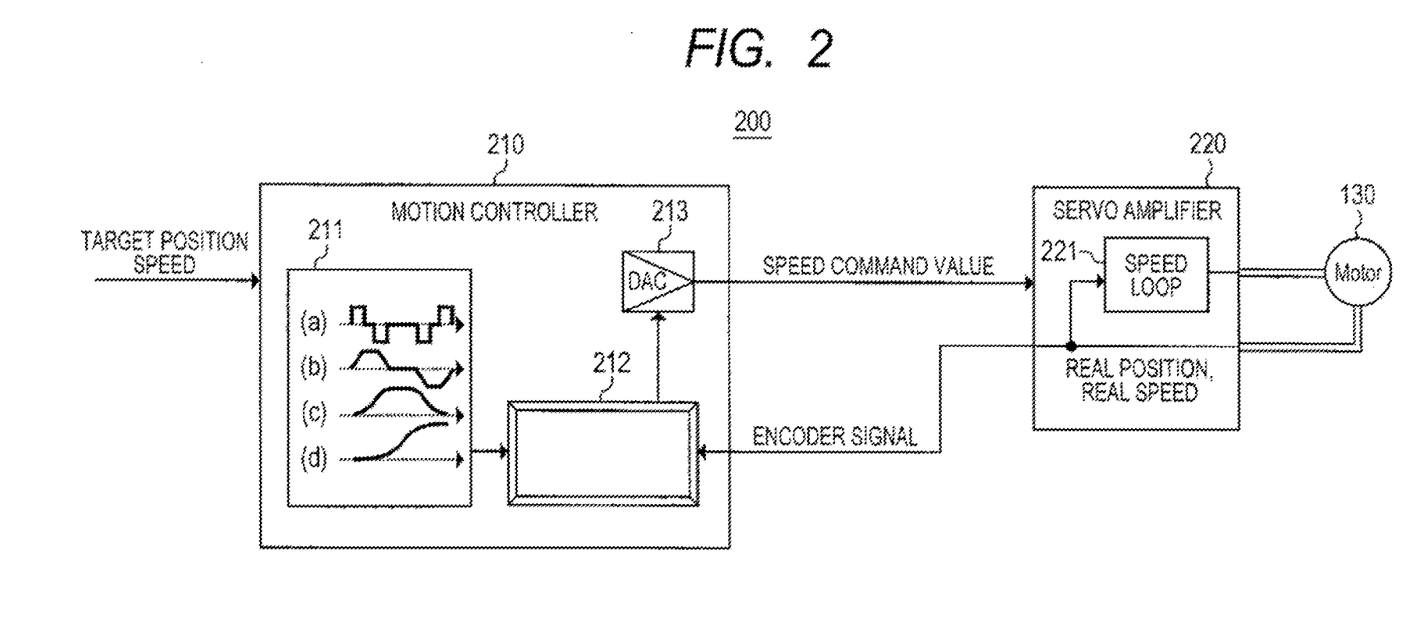
FIG. 2 is a block structure diagram for explaining a basic principle of an embodiment of a control system according to the present invention.

FIG. 2 is a block structure diagram for explaining a basic principle of an embodiment of a control system according to the present invention. Reference numeral 200 denotes a control system, reference numeral 210 designates a motion controller, reference numeral 211 denotes an ideal waveform generation section for generating/processing ideal command waveforms, reference numeral 212 denotes a command waveform generation section, reference numeral 213 designates a DAC (Digital to Analog Converter), reference numeral 220 denotes a servo amplifier, reference numeral 221 designates a speed loop control section, and reference numeral 130 denotes a servo motor. The same elements as shown in FIG. 1 are illustrated by like reference numerals and description of them is omitted.

As shown in FIG. 2, in the control system 200 according to the present invention, the motion controller 210 and the servo amplifier 220 are made under closed loop control. Therefore, speed control is performed in the speed loop control section 221 of the servo amplifier 220, utilizing a present command position, and a real position and real speed that are obtained from the motor 130. However, the speed loop control section 221 performs its speed control by regenerating the command waveform while the motion controller 210 obtains the real speed and the real position from the motor 130 and limits jerk. Incidentally, the command waveform generation section 212 is a CPU (Central Processing Unit), for example.

For example, in FIG. 2, target position-speed is given to the control system 200. Then, the real position and the real speed are by turns inputted as encoder signals to the command waveform generation section 212 through the servo amplifier 220 or directly from the motor 130.

The ideal waveform generation section 211 of the motion controller 210 outputs (a) a jerk waveform, (b) an acceleration waveform, (c) a speed waveform, and (d) a position waveform to the command waveform generation section 212 as command waveforms of an output signal.

The command waveform generation section 212 regenerates and outputs by turns future command waveforms to the DAC 213 while limiting the jerk, according to the output signal waveforms outputted from the ideal waveform generation section 211 and the encoder signals inputted from the motor 130. For example, the command waveform generation section 212 performs (1) a command waveform input/output processing, (2) an encoder signal counting processing, and (3) a command waveform regeneration processing.

The DAC 213 converts a command value of inputted digital to a speed command value of an analog signal and outputs it to the speed loop control section 221 of the servo amplifier 220. Incidentally, the encoder signal accumulates a positional deviation amount as a pulse in an encoder signal counter (FIG. 4B discussed below, etc.).

The speed loop control section 221 of the servo amplifier 220 controls a revolution speed of the motor 130 according to the speed command value inputted from the motion controller 210 and the encoder signal inputted from the motor 130.

The motor 130 revolves at revolution speed inputted from the speed loop control section 221 of the servo amplifier 220 according to control of revolution speed, and outputs the real position and the real speed to the speed loop control section 221 of the servo amplifier 220 and the command waveform generation section 212 of the motion controller 210 as the encoder signals.

Incidentally, in the embodiment shown in FIG. 2, the real position of a driven material is calculated from a count value of the motor 130 (number of revolution and revolution angle) and the real speed is calculated based on the calculated real position. However, a position detection device directly detecting the position of the driven material may be provided and a position which the position detection device detects may be the real position.

Next, an embodiment of the motor control system according to the present invention and an embodiment of a motor control method according to the present invention will be further explained below.

Figure 3:
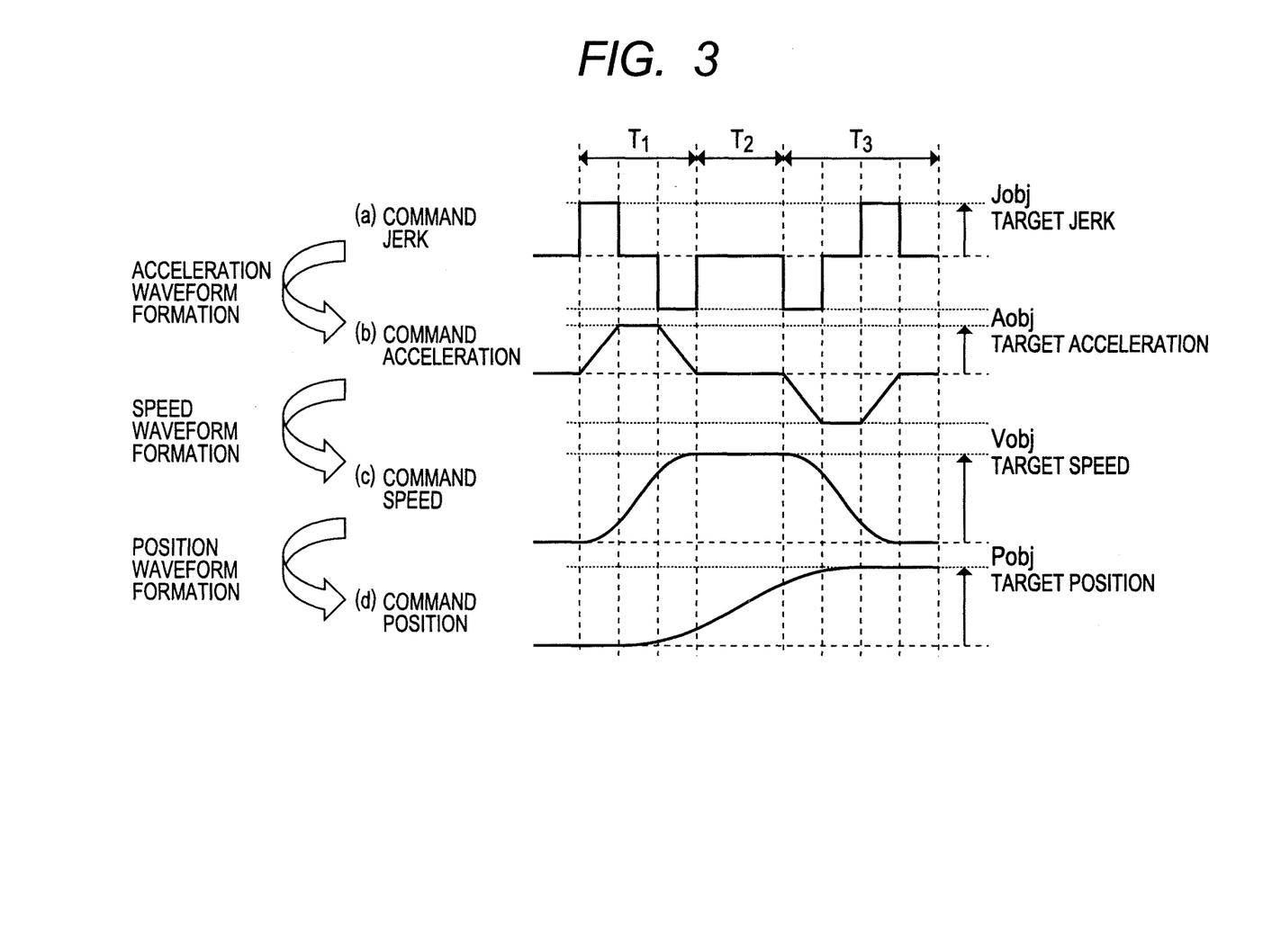
FIG. 3 is a view for explaining examples of ideal command waveforms generated in an ideal waveform generation section in a motion controller of the motor control system according to the present invention.

First, as shown in FIG. 3 which will be referred to below, ideal command waveforms are generated from target jerk JD, acceleration AD, speed VD, and a position PD.

Next, as illustrated by processes in the control block diagram of FIG. 4B, a command output processing and a command waveform regeneration processing are performed. At this time, the command waveform regeneration processing is carried out so as to add to the ideal command waveform (for example, the ideal jerk waveform) a jerk-added waveform to which a deviation amount is added.

FIG. 3 is a view for explaining examples of command waveforms generated in an ideal waveform generation section in the motion controller of the motor control system according to the present invention. FIG. 3(a) shows a command jerk waveform, FIG. 3(b) shows a command acceleration waveform generated from the command jerk waveform, FIG. 3(c) shows a command speed waveform generated from the command acceleration waveform, and FIG. 3(d) shows a command position generated from the command acceleration waveform. The command position means a position to which the driven material is moved. Incidentally, an abscissa axis shows time. Moreover, in FIGS. 3(a)-3(d), Jobj is target jerk, Aobj is target acceleration, Vobj is target speed, and Pobj is a target position.

In FIG. 3(a), n is the number of a command output cycle outputting a command waveform of 1 pulse, and is a multiple of eight. As shown in FIG. 3, the motor driving the driven material is jerk-controlled in such a manner that it is gradually accelerated for an initial period T1 from commencement of moving, driven at a constant speed for a middle period T2, and gradually decelerated for a period T3 approaching a final movement position and stops.

While n is the multiple of eight in this embodiment, the waveform may be a waveform wherein the jerk command value varies to a positive value, a negative value, the negative value, and the positive value in a case where the target position is a positive direction, or varies to the positive value, the negative value, and the positive value in the case where the target position is the positive direction.

This is why a region of zero of the jerk command value becomes absent, if a target movement distance is short.

In FIG. 4B, the previously generated ideal command waveforms (the Jerk JD, the acceleration AD, the speed VD, and the position PD) are first read out. FIG. 4B is a block diagram which illustrates a structure of the embodiment of the motor control system according to the present invention, and which explains examples of the command waveforms generated in the motion controller of the motor control system of the present invention. Moreover, FIG. 4A is a diagram for explaining the jerk-added waveform in the embodiment of the motor control system of the present invention.

Figure 4A:
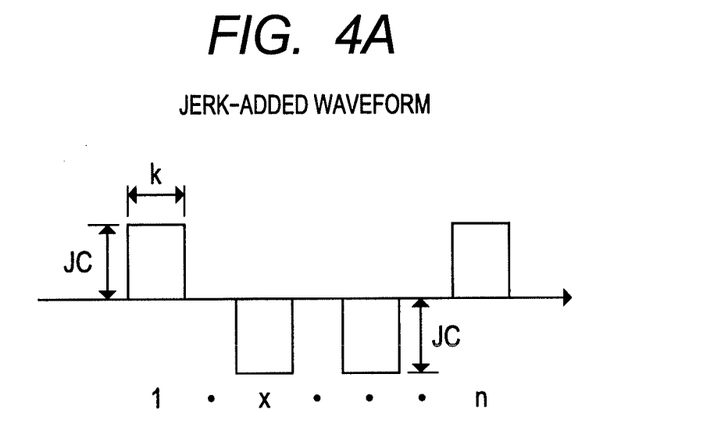
FIG. 4A is a view for explaining jerk-added waveforms of the embodiment of the motor control system according to the present invention.
Figure 4B:
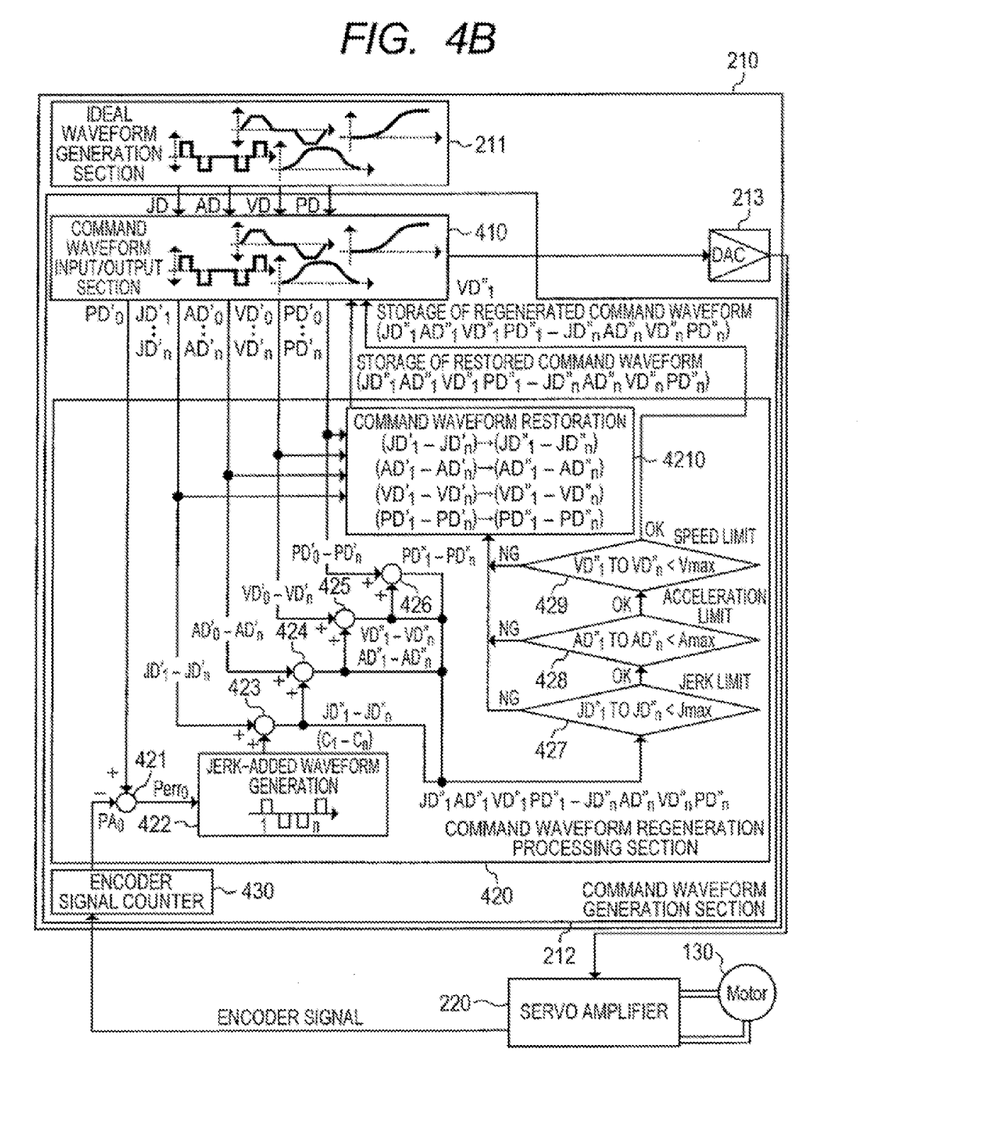
FIG. 4B is a view illustrating a structure of an embodiment of the motor control system according to the present invention.

In FIG. 4A, k is a pulse width, JC is a pulse height, x is a pulse number ($1 \leq x \leq n$, x and n are natural numbers).

Next, in FIG. 4B, the ideal waveform generation section 211 of the motion controller 210 outputs to a command waveform input/output section 410 of the command waveform generation section 212 pulses of the ideal jerk waveform JD, ideal acceleration waveform AD, ideal speed waveform VD, and ideal position waveform PD, as ideal command waveforms.

Incidentally, the command waveform input/output section 410 stores command jerk waveforms JD'1-JD'n regenerated with previous-time command output timing, and command acceleration waveforms AD'0-AD'n, command speed waveforms VD'0-VD'n, and command position waveforms PD'0-PD'n from just short of one command output cycle among the command waveforms regenerated with the previous-time command output timing. The command waveform input/output section 410 outputs target command position PD'0, command jerk waveforms JD'1-JD'n regenerated with the respective previous-time timings, command acceleration waveforms AD'0-AD'n−1 from just short of one command output cycle, command speed waveforms VD'0-VD'n−1 from just short of one command output cycle, the command position waveforms PD'0-PD'n−1 from just short of one command output cycle, to a subtracter 421 and adders 423, 424, 425, 426 of a command waveform regenerating/processing section 420 of the command waveform generation section 212.

At this time, an encoder signal counter 430 of the command waveform generation section 212 obtains a present real position PA0 from an encoder count value of the motor 130 and outputs it to the subtracter 421.

The subtracter 421 subtracts the present real position PA0 from the present target command position PD'0 to calculate a deviation amount Perr and outputs it to a jerk-added waveform generation section 422.

The jerk-added waveform generation section 422 generates such jerk waveforms C1-Cn as the deviation amount Perr becomes "0" in the future with the number n of the command output cycle.

For example, the jerk waveforms C1-Cn are generated by the following processes (1)-(3). Incidentally, the following description will be made as a positional deviation target compensation amount is P (Perr is used as P as it is), a command output cycle is TC, a deviation amount compensation target time is TN, a deviation amount compensation target command output cycle is an n number, a width of the jerk waveform is K, and a size of the jerk-added waveform is JC.

{Procedure (1)}

First, the width K of the jerk waveform is calculated as follows.

In order to fix a shape of the jerk-added waveform from TN>(TC×n), n is set to the multiple of eight.

Namely, TN>(TC×8×K) and the width K of the jerk waveform is set to K<(TN/(TC×8)).

{Procedure (2)}

Next, the size JC of the jerk-added waveform is calculated from the following equation:

$$JC = (1/8) \times (P/K^3 \times TC^3).$$

{Procedure (3)}

Next, the jerk-added waveforms C1-Cn are generated.

The jerk-added waveforms C1-Cn for compensating the deviation amount become as follows. Incidentally, x means an x-th waveform of 1−n.

When $x/K \leq 1$, $Cx = JC$
When $x/K \leq 2$, $Cx = 0$
When $x/K \leq 3$, $Cx = -JC$
When $x/K \leq 4$, $Cx = 0$
When $x/K \leq 5$, $Cx = -JC$
When $x/K \leq 6$, $Cx = 0$
When $x/K \leq 7$, $Cx = JC$
When $x/K \leq 8$, $Cx = 0$.

For example, when K=1, the jerk-added waveforms C1-Cn becomes as follows.

C1-Cn={JC, 0, −JC, 0, −JC, 0, JC, 0}.

Namely, C1=JC, C2=0, C3=−JC, C4=0, C5=−JC, C6=0, C7=JC, and C)=0.

Figure 5:
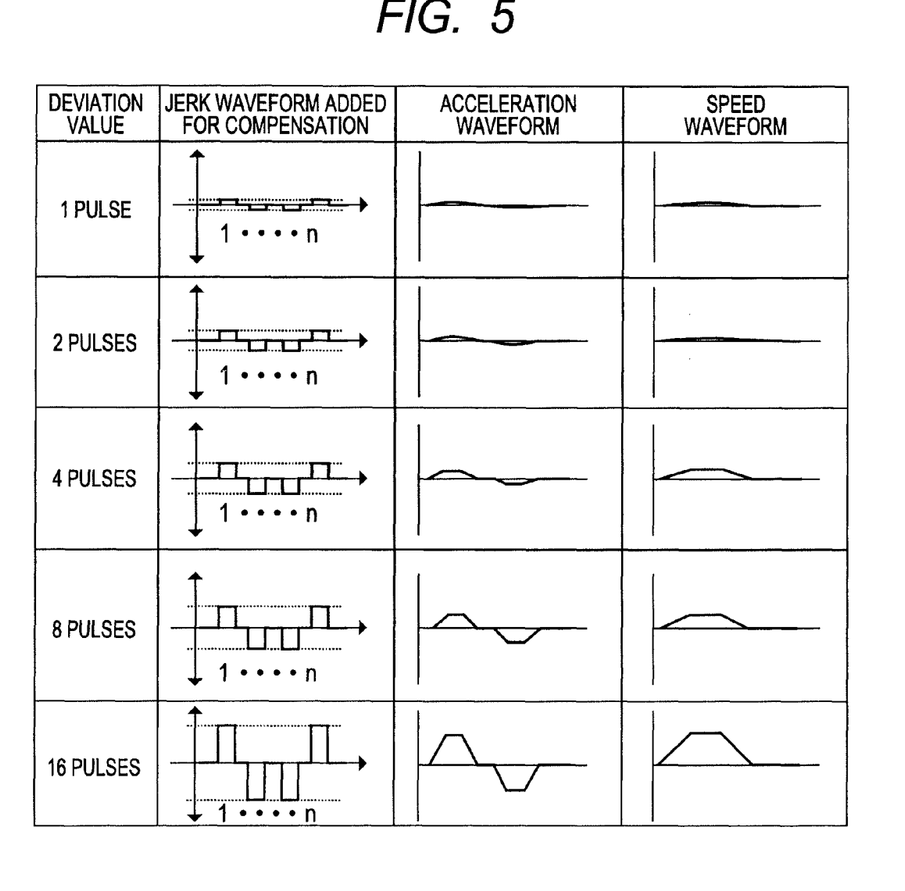
FIG. 5 is a view which shows a jerk waveform added for compensation, an acceleration waveform, and a speed waveform in a case where deviation amounts are 1 pulse, 2 pulse, 4 pulse, 8 pulse, and 16 pulse when the present invention is put into practice.

In FIG. 5, examples of the jerk-added waveform for compensating the deviation amount P are shown.

FIG. 5 is a view which shows a jerk waveform to be added for compensation, an acceleration waveform to be added for compensation, and a speed waveform to be added for compensation in a case where the deviation amounts are 1 pulse, 2 pulses, 4 pulses, 8 pulses, and 16 pulses when the present invention is put into practice. As shown in FIG. 5, larger the deviation amount becomes, higher the height JC of the jerk waveform becomes.

Next, in FIG. 4B, the jerk-added waveform generation section 422 outputs the jerk-added waveforms C1-Cn to the adder 423. The adder 423 performs the addition of the jerk-added waveforms C1-Cn and the command jerk waveforms JD'1-DJ'n generated with the previous-time timing, regenerates all the command jerk waveforms JD"1-JD"n corresponding to the number n of the command output cycles, and outputs them to a jerk limit section 427 and the adder 424.

For example, the outputs of the adder 423 become to be JD"1=JD'1+C1, JD"2=JD'2+C2, JD"3=JD'3+C3 . . . JD"n=JD'n+Cn.

The adder 424 performs the addition of the regenerated command jerk waveforms JD"1-JD"n and the command acceleration waveforms AD'0-AD'n−1, generated with the previous-time timing, from just short of one command output cycle, regenerates all the command acceleration waveforms AD"1-AD"n which correspond to the number n of the command output cycles, and outputs them to the adder 425 and the jerk limit section 427.

For example, the outputs of the adder 424 become to be AD"1=AD'0+JD"1, AD"2=AD'1+JD"2, AD"3=AD'2+JD"3 . . . AD"n=AD'(n−1)+JD"n.

The adder 425 performs the addition of the regenerated command acceleration waveforms AD"1-AD"n and the command speed waveforms VD'0-VD'n, generated with the previous-time timing, from just short of the one command output cycle n, regenerates all the command accelerations VD"1-VD"n corresponding to the number n of the command output cycles, and outputs them to the adder 426 and the jerk limit section 427.

For example, the outputs of the adder 425 become to be VD"1=VD'0+AD"1, VD"2=VD'1+AD"2, VD"3=VD'2+AD"3, . . . VD"n=VD'(n−1)+AD"n.

The adder 426 performs the addition of the regenerated command speed waveforms VD"1-VD"n and the command position waveforms PD'0-PD'n−1, generated with the previous-time timing, from just short of the one command output cycle, regenerates all the command position waveforms PD"1-PD"n corresponding to the number n of the command output cycles, and outputs them to the jerk limit section 427.

For example, the outputs of the adder 426 become to be PD"1=PD'0+VD"1, PD"2=PD'1+VD"2, PD"3=PD'2+VD"3 . . . PD"n=PD'(n−1)+VD"n.

Figure 7:
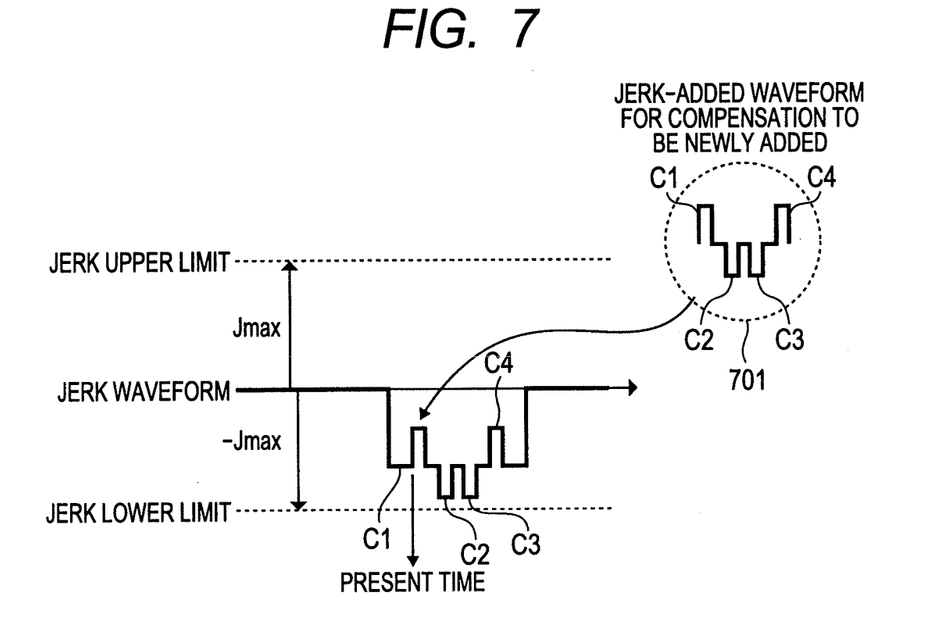
FIG. 7 is a diagram for explaining a jerk upper/lower limit confirmation processing operation in an embodiment of the motor control system according to the present invention and an embodiment of the motor control method according to the present invention.

The jerk limit section 427 confirms, as shown in FIG. 7, whether or not the regenerated command jerk waveforms JD"1-JD"n exceed an upper limit (or a lower limit).

FIG. 7 is a view for explaining a jerk upper/lower limit confirmation processing operation in the embodiment of the motor control system according to the present invention and the embodiment of the motor control method according to the present invention.

In FIG. 7, the jerk upper limit Jmax and the jerk lower limit −Jmax are previously set.

In FIG. 7, in the adder 423, the jerk-added waveform within a broken line circle 701 is added to the command jerk waveforms JD'1-JD'n generated with the previous-time timing. That is, addition waveform pulses C1, C2, C3, and C4 are added to jerk waveforms indicated by thick lines (command jerk waveforms JD"1-JD"n).

In this case, the jerk limit section 427 detects whether or not the pulse waveforms C1, C2, C3, and C4 at present time are between the upper limit Jmax and the lower limit −Jmax, judges for OK or NG, and causes the output to be branched. For example, it detects whether or not the waveform C2 at the present time is less than the upper limit Jmax (JD"1-JD"n<Jmax). Then, if it is not (NG), it outputs NG information to a command waveform restoration section 4210. Moreover, if it is OK, it detects whether or not the waveform C2 at the present time exceeds the lower limit −Jmax (−Jmax<JD"1-JD"n). Then, if it is not (NG), it outputs NG information to the command waveform restoration section 4210. Moreover, if it is OK, it outputs the command jerk waveforms JD"1-JD"n, the command acceleration waveforms AD"1-AD"n, the command speed waveforms VD"1-VD"n, and the command position waveforms PD"1-PD"n to the acceleration limit section 428.

Next, in FIG. 4B, like the jerk limit section 427, an acceleration limit section 428 detects whether or not the acceleration waveforms at the present time are less than an upper limit Amax (AD"1-AD"n<Amax). Then, if it is not (NG), it outputs NG information to the command waveform restoration section 4210. Moreover, if it is OK, it detects whether or not the waveforms at the present time exceed a lower limit −Amax (−Amax<AD"1-AD"n). If it is not (NG), it outputs NG information to the command waveform restoration section 4210. Moreover, if it is OK, it outputs the command jerk waveforms JD"1-JD"n, the command acceleration waveforms AD"1-AD"n, the command speed waveforms VD"1-VD"n, and the command position waveforms PD"1-PD"n to a speed limit section 429.

Moreover, in FIG. 4B, like the jerk limit section 427, the speed limit section 429 detects whether or not the speed waveforms at the present time are less than an upper limit Vmax (VD"1-VD"n<Vmax). Then, if it is not (NG), it outputs NG information to the command waveform restoration section 4210. Moreover, if it is OK, it detects whether or not the waveforms at the present time exceed a lower limit −Vmax (−Vmax<VD"1-VD"n). Then, if it is not (NG), it outputs NG information to the command waveform restoration section 4210. Moreover, if it is OK, it outputs the command jerk waveforms JD"1-JD" n, the command acceleration waveforms AD"1-AD"n, the command speed waveforms VD"1-VD"n, and the command position waveforms PD"1-PD"n to the command waveform input/output section 410.

In a case where the NG information is inputted to the command waveform restoration section 4210 from any of the jerk limit section 427, the acceleration limit section 428, and the speed limit section 429, the command waveform restoration section 4210 restores the previous-time command waveforms and postpones correcting a total deviation amount until next-time command output (confirmation process of the upper limit and the lower limit). Namely, it outputs the previous-time restored-command waveforms to the command waveform input/output section 410.

Incidentally, while the command waveform restoration section 4210 restores the previous-time command waveforms in the above-mentioned embodiment, it may output the NG information and the command waveform input/output section 410 may treat the previous-time stored-command waveforms as the present command waveforms according to the NG information. An example in which the command waveform input/output section 410 performs the restoration is shown in FIG. 4C.

Figure 4C:
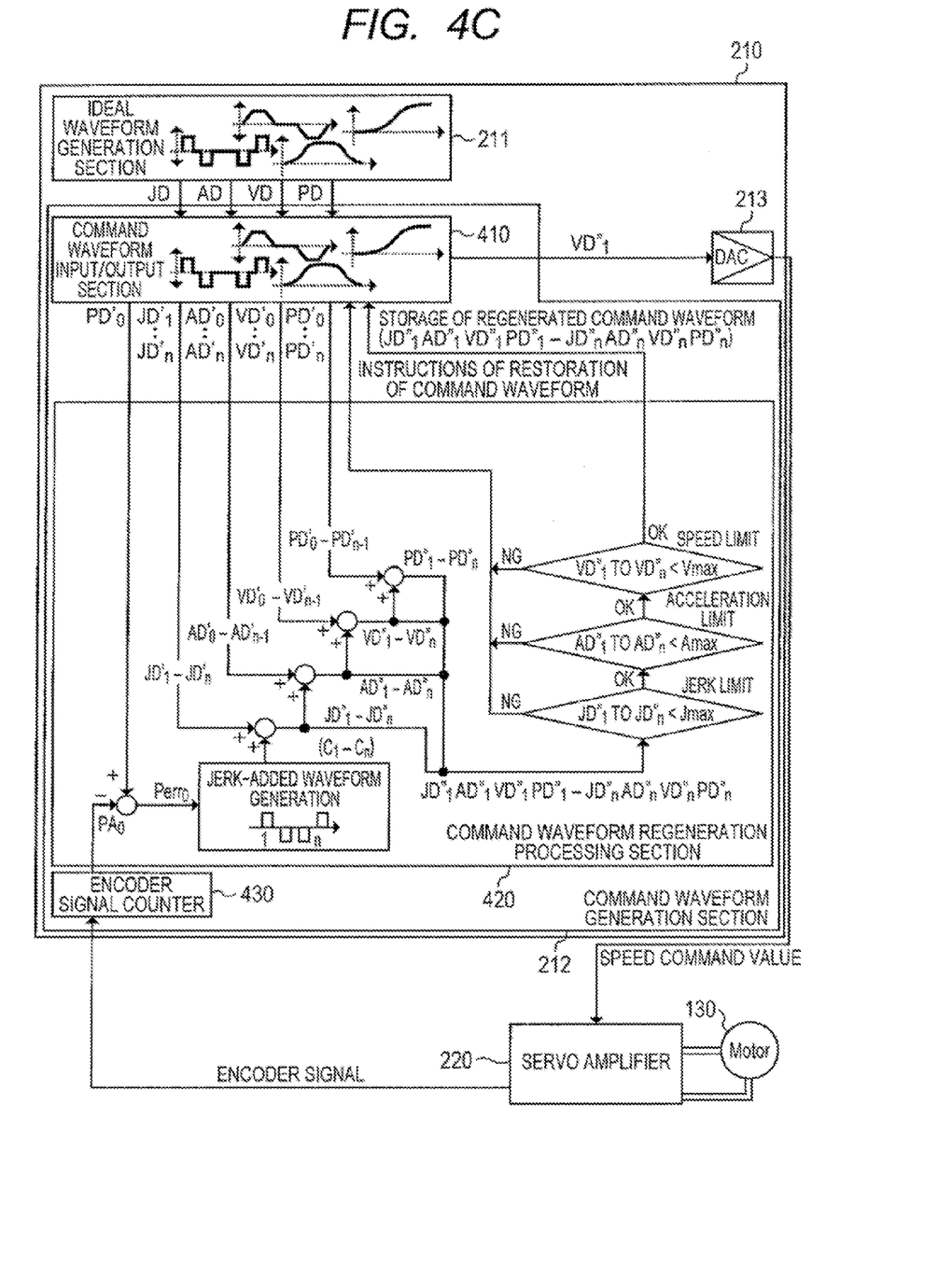
FIG. 4C is a view illustrating a structure of an embodiment of the motor control system according to the present invention.

Thereafter, in FIGS. 4B and 4C, the regenerated command waveforms JD"1-JD"n, AD"1-AD"n, VD"1-VD"n, and PD"1-PD"n are stored as new command waveforms.

The speed command value VD"1 of the command waveforms is output from the command waveform input/output section 410 to the DAC 213 which outputs the speed command value converted to analog to the servo amplifier 220.

In FIG. 4B, the DAC 213 converts the inputted speed command value VD"1 to an analog value and outputs it to the servo amplifier 220. The servo amplifier 220 revolution-drives the motor 130 according to the inputted analog data and outputs the revolution position (and revolution speed) of the motor 130 to the command waveform generation section 212 as the encoder signal.

The encoder signal outputted from the motor 130 is inputted to the encoder signal counter 430 of the command waveform generation section 212.

The encoder signal counter 430 outputs to the command waveform regeneration processing section 420 a count value $PA_0$ counted in a predetermined cycle.

In the command waveform regeneration processing section 420, the adder 421 inputs to its subtraction input terminal the count value $PA_0$ which the encoder signal counter 430 outputs.

The servo amplifier 220 controls the motor 130 according to the inputted speed command value VD"1.

Figure 8:
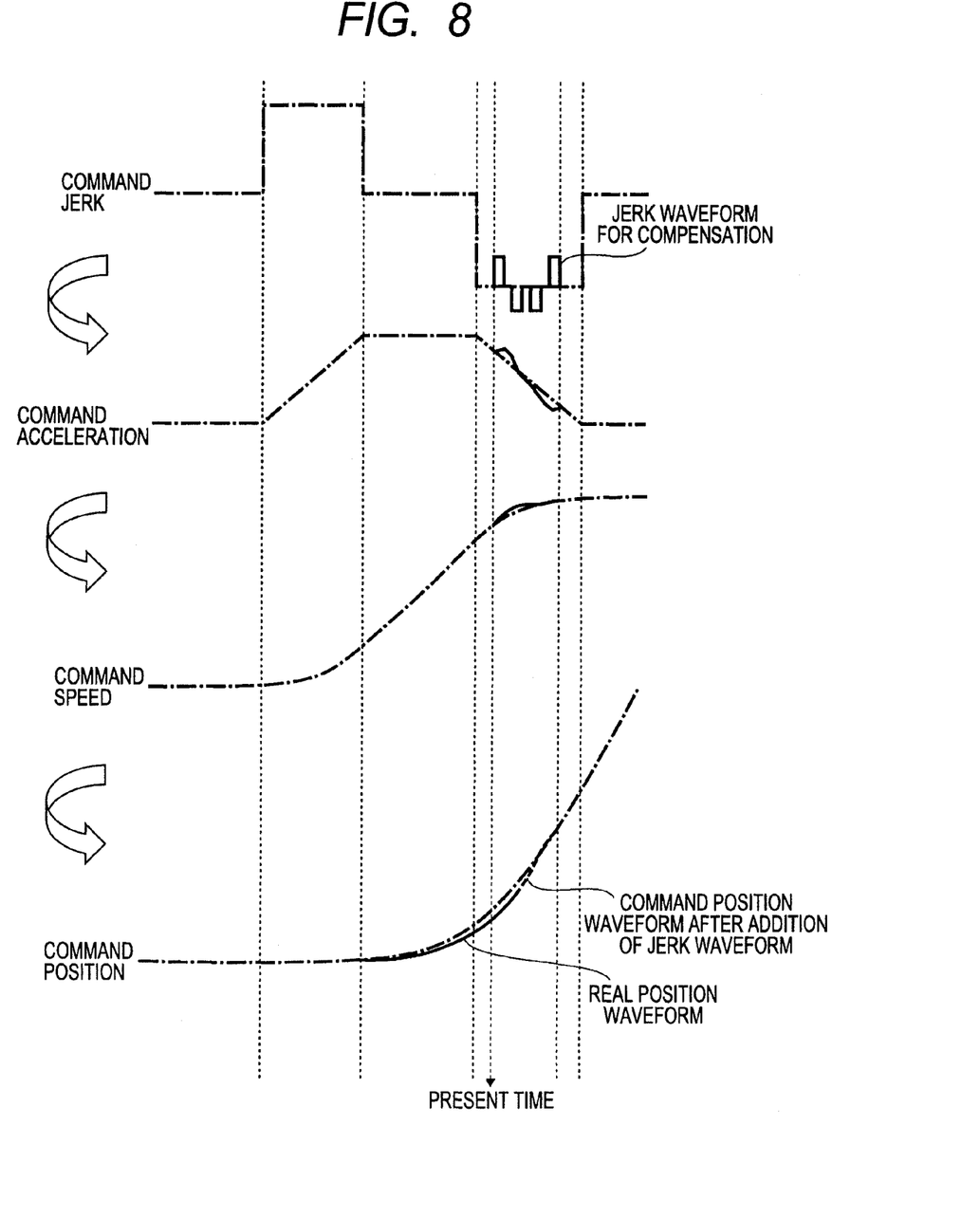
FIG. 8 is a diagram showing examples of command waveforms regenerated after jerk waveforms for compensation are calculated in the motor control system and motor control method according to the present invention.

A situation where all the command waveforms are regenerated is shown in FIG. 8. FIG. 8 is a view which illustrates examples of the regenerated command waveform after calculating of the jerk waveforms for compensation in the motor control system and motor control method according to the present invention. An abscissa axis and an ordinate axis indicate time and a pulse height, respectively. Alternate long and short dash lines each indicate the waveforms prior to compensation and, during a period Tj of adding the jerk waveforms for compensation in the command jerk from the present time, the motor 130 is controlled with waveforms indicated by solid lines.

As a result, the motor 130 revolves and, when the motor is revolution-operated at high speed according to the revolution, it is possible to restrain vibration and deviation relative to an advancing direction of the driven material and realize settling time shortening. Moreover, it is possible to cause the motor to be operated with an ideal track and, since it is possible to always monitor the present position, it is made easy to cause a plurality of axes to be synchronously operated.

Incidentally, in FIG. 8, the real position waveform is viewed so as to be deviated prior to the present time. This indicates a deviation (positional deviation) relative to the waveform of the command until the present time. In fact, since the correction is continued to be performed at an interval of a very short command output cycle, such a remarkable deviation as in FIG. 8 does not occur. In FIG. 8, in order to emphasizingly express the situation in which the position is corrected, the real position at the present time is caused to be slightly deviated from the command waveform.

Figure 6:
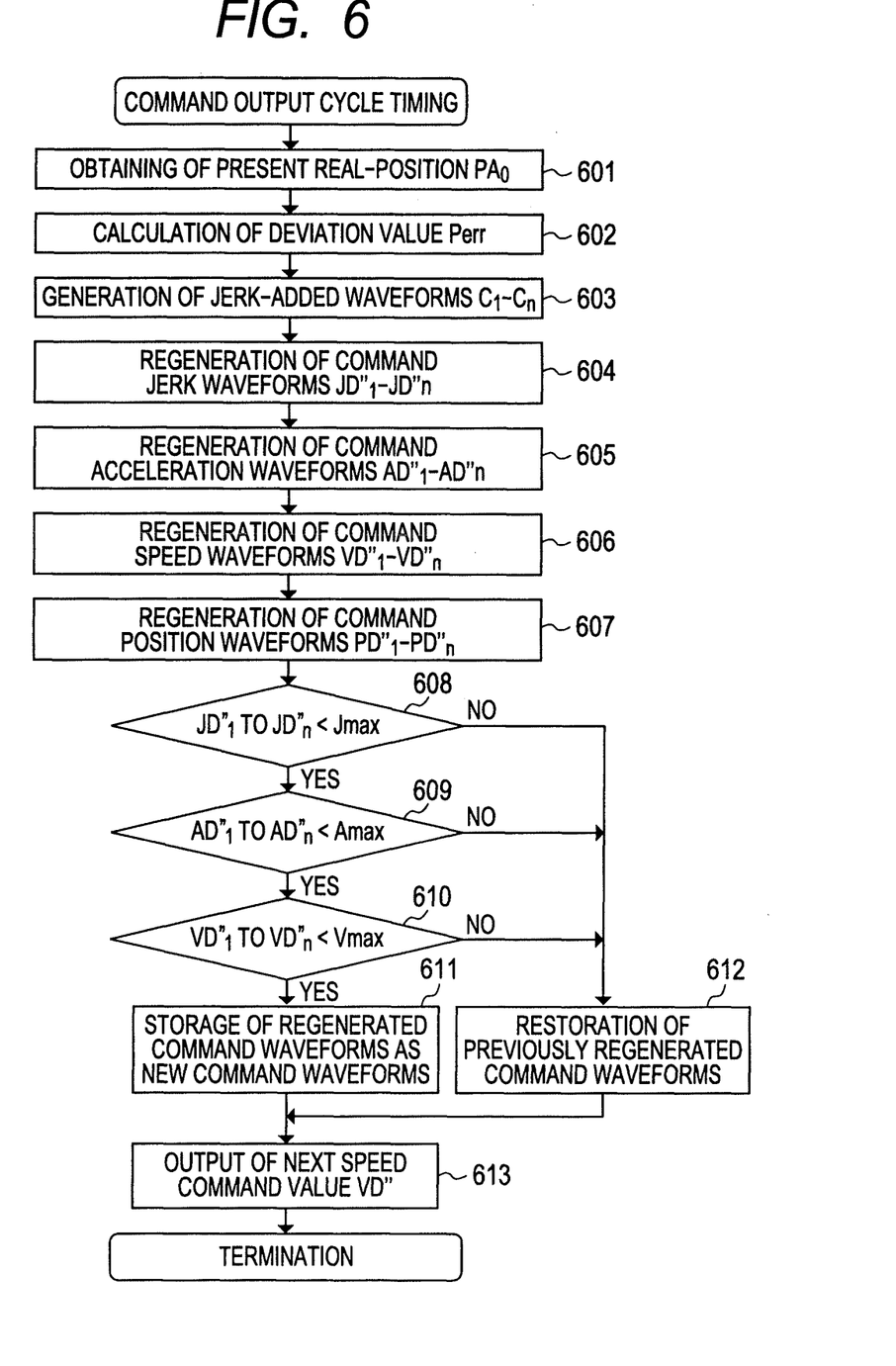
FIG. 6 is a flow chart for explaining processes of operation in an embodiment of a motor control method according to the present invention.

FIG. 6 is a flow chart for explaining an example of procedures of operating the motor control method according to the present invention. Referring to FIG. 6, procedures of forming the command jerk waveforms JD", the command acceleration waveforms AD", the command speed waveform VD" and the command position waveforms PD", with the command output cycle timing, will be explained.

In step 601, the present real-position PA0 is obtained from the encoder count value.

In step 602, the deviation amount Perr is calculated from the real position PA0 and the present command position PD"0.

In step 603, such jerk-added waveforms C1-Cn as the deviation amount becomes "0" in the future are generated in the number n of the command output cycles.

In step 604, the jerk-added waveforms C1-Cn are added to the command jerk waveforms JD'1-JD'n and all the command jerk waveforms JD"1-JD"n of the number n of the command output cycles are regenerated.

In step 605, all the command acceleration waveforms AD"1-AD"n of the number n of the command output cycles are regenerated from the command acceleration waveforms AD'0-AD'n−1 from just short of one command output cycle and the regenerated command jerk waveforms JD"1-JD"n.

In step 606, the command speed waveforms VD"1-VD"n are generated in the same manner as in the regeneration of the command acceleration waveforms AD"1-AD"n (step 605).

In step 607, the command position waveforms PD"1-PD"n are regenerated in the same manner as in the regeneration of the command acceleration waveforms AD"1-AD"n (step 605) or in the same manner as in the regeneration of the command speed waveforms VD"1-VD"n (step 606).

In step 608, whether or not the regenerated jerk waveforms JD"1-JD"n are less than the upper limit Jmax is confirmed. In the event that they exceed the upper limit Jmax, the process progresses to step 612 and, in the event that they are less than the upper limit, the process progresses to step 609.

In the step 609, whether or not the regenerated acceleration waveforms AD"1-AD"n are less than the upper limit Amax are confirmed. In the event that they exceed the upper limit Amax, the process progresses to the step 612 and, in the event that they are less than the upper limit, the process progresses to step 610.

In the step 610, whether or not the regenerated speed waveforms VD"1-VD"n are less than the upper limit Vmax. In the event that they exceed the upper limit Vmax, the process progresses to the step 612 and, in the event that they are less than the upper limit, the process progresses to step 611.

In the step 611, the regenerated command jerk waveforms JD"1-JD"n, the regenerated command acceleration waveforms AD"1-AD"n, the regenerated command speed waveforms VD"1-VD"n, and the regenerated command position waveforms PD"1-PD"n are stored as new command waveforms.

In step 613, next-time speed command values VD" 1-VD"n are outputted from the DAC 312, and the process illustrated in FIG. 6 is terminated, and progresses to operation of the next command output cycle timing.

In the step 612, the regeneration command waveforms are restored with the previous-time command waveforms and the process progresses to step 613. That is, the previous-time command jerk waveforms JD'1-JD'n are used as the command jerk waveforms JD"1-JD"n. Also, the previous-time command acceleration waveforms AD'1-AD'n are used as the command acceleration waveforms AD"1-AD"n. Moreover, the previous-time command speed waveforms VD'1-VD' n are used as the command speed waveforms VD"1-VD"n. Also, the previous-time command position waveforms PD'1-PD'n are used as the command position waveforms PD"1-PD"n.

The present invention has been explained above in detail with reference to the embodiments. The present invention may be also applied to a linear motor other than the motor revolving. Concretely, in FIG. 2, the speed loop control section 221 controls the moving speed of the motor 130 according to the speed command value inputted from the motion controller 210, and the encoder signal inputted from the motor 130.

The motor 130 moves at moving speed according to the control of the moving speed inputted from the speed loop control section 221 of the servo amplifier 220 and outputs the real position and the real speed to the speed loop control section 221 of the servo amplifier 220 and the command waveform generation section 212 of the motion controller 210 as the encoder signals.

Incidentally, in the embodiment illustrated in FIG. 2, the real position of the driven material is calculated from the count value of the motor 130 and the real speed is calculated based on the calculated real position. However, a position detection device for directly detecting the position of the driven material may be provided and the position detected by the position detection device may be regarded as the real position.

For example, in FIG. 4B, the DAC 213 converts the inputted speed command value VD"1 to an analog date and outputs it to the servo amplifier 220. The servo amplifier 220 drives the motor 130 according to the inputted analog value and outputs the moving position (and moving speed) to the command waveform generation section 212 as the encoder signal.

The encoder signal outputted from the motor 130 is inputted to the encoder signal counter 430 of the command waveform generation section 212.

The encoder signal counter 430 outputs the count value $PA_0$, which it counts in a predetermined cycle, to the command waveform regeneration processing section 420.

In the command waveform regeneration processing section 420, the adder 421 outputs to its subtraction input terminal the count value $PA_0$ which the encoder signal counter 430 outputs.

The situation where all the command waveforms are regenerated is shown in FIG. 8. FIG. 8 is a view which illustrates examples of the regenerated command waveform after calculating of the jerk waveforms for compensation in the motor control system and motor control method according to the present invention. An abscissa axis and an ordinate axis indicate time and a pulse height, respectively. Alternate long and short dash lines each indicate the waveforms prior to compensation and, during a period Tj of adding the jerk waveforms for compensation in the command jerk from the present time, the motor 130 is controlled with waveforms indicated by solid lines.

As a result, the motor 130 moves and, when the motor is movement-operated at high speed according to the movement, it is possible to restrain vibration and deviation relative to the advancing direction of the driven material and realize settling time shortening. Moreover, it is possible to cause the motor to be operated with an ideal track and, since it is possible to always monitor the present position, it is made easy to cause a plurality of axes to be synchronously operated.

Moreover, it is possible to apply the present invention to the whole motor, such as a motor having an encoder counter function.

Moreover, while the present invention is not limited to the above-mentioned embodiments, it is a matter of course that it will be obvious to those skilled in the art that various changes and modifications may be made in the invention without departing from the concept and spirit thereof.

For example, while in the above-mentioned embodiments, the command waveform input/output section outputs the speed command value and controls the motor, it may output the acceleration command value in lieu of the speed command value and control the motor. Consequently, it is possible to not only control the position but also control a load.

INDUSTRIAL APPLICAPABILITY

The servo control system and servo control method according to the present invention are utilized in a semiconductor manufacturing apparatus, such as a die bonder, etc.

What is claimed is:

1. A motor control system driving a driven material by a servo motor and controlling it, the motor control system comprising:
   an ideal waveform generation section generating ideal command waveforms of jerk, acceleration, speed, and a position;
   a command waveform generation section reading out the ideal waveforms, regenerating a target command position, and command waveforms of the jerk, the acceleration, the speed and the position, and outputting a command waveform of the speed regenerated;
   a DAC converting the command waveform of the regenerated speed to an analog date; and
   a servo motor driving according to control of the analog date and outputting a real position as an encoder signal;
   the command waveform generation section being provided with a command waveform regeneration processing section which generates a jerk-added waveform based on the real position according to the encoder signal, and the target command position, adds the generated jerk-added waveform to the previous-time command jerk waveform to regenerate a jerk command waveform, and regenerates a command acceleration waveform, a command speed waveform, and a command position waveform, and a command waveform input/output section which stores the generated ideal command waveforms, the regeneration jerk command waveform, the command acceleration waveform, the command speed waveform, and the command position waveform.

2. A motor control system according to claim 1, wherein the command waveform regeneration processing section includes a jerk-added waveform generation section which generates the jerk-added waveform from a deviation amount which is a difference between the rear position according to the encoder signal, and the target command position.

3. A motor control system according to claim 2, wherein the command waveform regeneration processing section further includes a jerk limit section and outputs NG information to the command waveform input/output section when the regenerated command jerk waveform exceeds a predetermined jerk upper limit value or is less than a predetermined jerk lower limit value and, when the NG information is inputted, the command waveform input/output section restores the command jerk waveform, the command acceleration waveform, the command speed waveform, and the command position waveform which are regenerated with the previous-time timing, regards the restored command jerk waveform, command acceleration waveform, command speed waveform, and command position waveform as the regenerated command jerk waveform, command acceleration waveform, command speed waveform, and command position waveform, and outputs the regenerated command acceleration waveform to the DAC.

4. A motor control system according to claim 2, wherein the command waveform regeneration processing section further includes a jerk limit section outputting NG information when the regenerated command jerk waveform exceeds a predetermined jerk upper limit value or is less than a predetermined jerk lower limit value, and a command waveform restoration section restoring the command jerk waveform, the command acceleration waveform, the command speed waveform, and the command position waveform which are regenerated with the previous-time timing and, when the NG information is inputted, and inputting them to the command waveform input/output section, and the command waveform input/output section regards the command jerk waveform, the command acceleration waveform, the command speed waveform, and the command position waveform which are restored, as the regenerated command jerk waveform, command acceleration waveform, command speed waveform, and command position waveform, and outputs the regenerated command speed waveform to the DAC.

5. A motor control system according to claim 1, wherein the command waveform generation section stores the command jerk waveform, the command acceleration waveform, the command speed waveform, and the command position waveform which are regenerated, as the command speed waveforms which are regenerated with the previous-time timing.

6. A motor control method according to claim 5, wherein the command jerk waveform, the command acceleration waveform, the command speed waveform, and the command position waveform which are regenerated are stored as command waveforms which are regenerated with the previous-time timing.

7. A motor control method of a motor control system for driving and controlling a driven material via a servo motor, the motor control method comprising the steps of:
   generating ideal waveforms of jerk, acceleration, speed, and a position;
   reading out the ideal waveforms;
   regenerating a target command position, and command waveforms of the jerk, the acceleration, the speed and the position;
   outputting a command waveform of the regenerated speed as an analog data;

driving the servo motor according to control of the analog data;

outputting a real position as an encoder signal;

generating a jerk-added waveform on the basis of the real position according to the encoder signal, and the target command position;

adding the generated jerk-added waveform to a command jerk waveform regenerated by a command waveform generation section with previous-time timing, and regenerating a jerk command waveform; and regenerating the command jerk waveform, the command acceleration waveform, the command speed waveform, and the command position waveform.

8. A motor control method according to claim 7, wherein the jerk-added waveform is generated from a deviation amount which is a difference between the real position according to the encoder signal, and the target command position.

9. A motor control method according to claim 8, wherein if the regenerated command jerk waveform exceeds a predetermined jerk upper limit value or is less than a predetermined jerk lower limit value, NG information is outputted, if the NG information is outputted, the command jerk waveform, the command acceleration waveform, the command speed waveform, and the command position waveform which are regenerated with the previous-time timing are restored, the command jerk waveform, the command acceleration waveform, the speed waveform, and the command position waveform which are restored are regarded as the command jerk waveform, the command acceleration waveform, the command speed waveform, and the command position waveform which are regenerated, the regenerated command speed waveform is outputted as an analog data, and the servo motor is driven according to control of the analog data.

* * * * *